(No Model.)
J. L. FORT & G. E. HOEY.
PIPING OR TUBING FOR DRAWING OFF BEER.
No. 578,144. Patented Mar. 2, 1897.
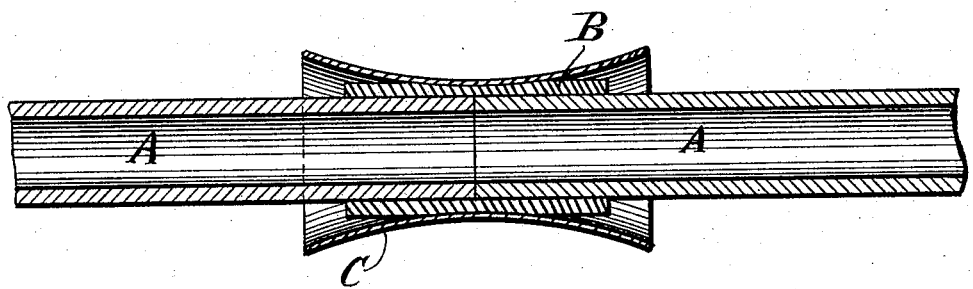
Witnesses
Edward Prew
Frank Ownsworth
Inventors
James Lord Fort
George Edwin Hoey
per H. J. Brighton
Attorney

United States Patent Office.

JAMES LORD FORT AND GEORGE EDWIN HOEY, OF BARNSLEY, ENGLAND.

PIPING OR TUBING FOR DRAWING OFF BEER.

SPECIFICATION forming part of Letters Patent No. 578,144, dated March 2, 1897.

Application filed May 7, 1895. Serial No. 548,436. (No model.) Patented in England November 7, 1894, No. 21,419.

*To all whom it may concern:*

Be it known that we, JAMES LORD FORT, a resident of Wellington Street, and GEORGE EDWIN HOEY, residing at 51 Huddersfield Road, Barnsley, in the county of York, England, subjects of the Queen of Great Britain, have invented certain new and useful Improvements in Piping or Tubing for Drawing off Beer or other Liquid Refreshment from the Barrel, (for which we have obtained a patent in Great Britain, No. 21,419, dated November 7, 1894,) of which the following is a full, clear, and exact specification thereof.

The object of our invention is to devise a coupling for piping or tubing for drawing off beer whereby the usual flanges upon said piping at the joints are dispensed with, and the piping with our improved coupling may be placed at slight inclinations without the risk of breaking the connections; and another object of our said invention is to arrange piping in such a manner that the condition of the beer may be observed before drawing off.

To attain the first object aforesaid, we arrange a coupling, as shown at Figure 1, which is a sectional elevation thereof, showing one part of the tubing at slight inclination with the other. The said coupling consists, essentially, of an asbestos ring or ferrule A, which is clamped so as to cover the joint C' of the tubing C by an asbestos ring or ferrule A, clamped to position by the concave annular metallic box B.

To attain the second object aforesaid, we extend the tubing, as shown at Fig. 2, which is a side elevation showing the drawing-off tubing connecting pumps P with the barrel Q, so that it is elevated in a siphon above the pumps, and the said tubing being composed of glass the condition of the beer is easily observed.

We would have it understood that we do not claim as our invention the mere use of glass tubing, *per se.* Neither do we claim the mere use of an asbestos ring A; but What we desire to secure by Letters Patent is—

The combination with glass tubing and a pliable and non-metallic packing-ring of a concavo-convex coupling-box substantially as described and for the attainment of the objects specified.

In testimony that we claim the foregoing we have hereunto set our hands this 26th day of April, 1895.

JAMES LORD FORT.
GEO. EDWIN HOEY.

Witnesses:
FRANK OWNSWORTH,
JAMES THOMAS PARRY.